Patented May 5, 1942

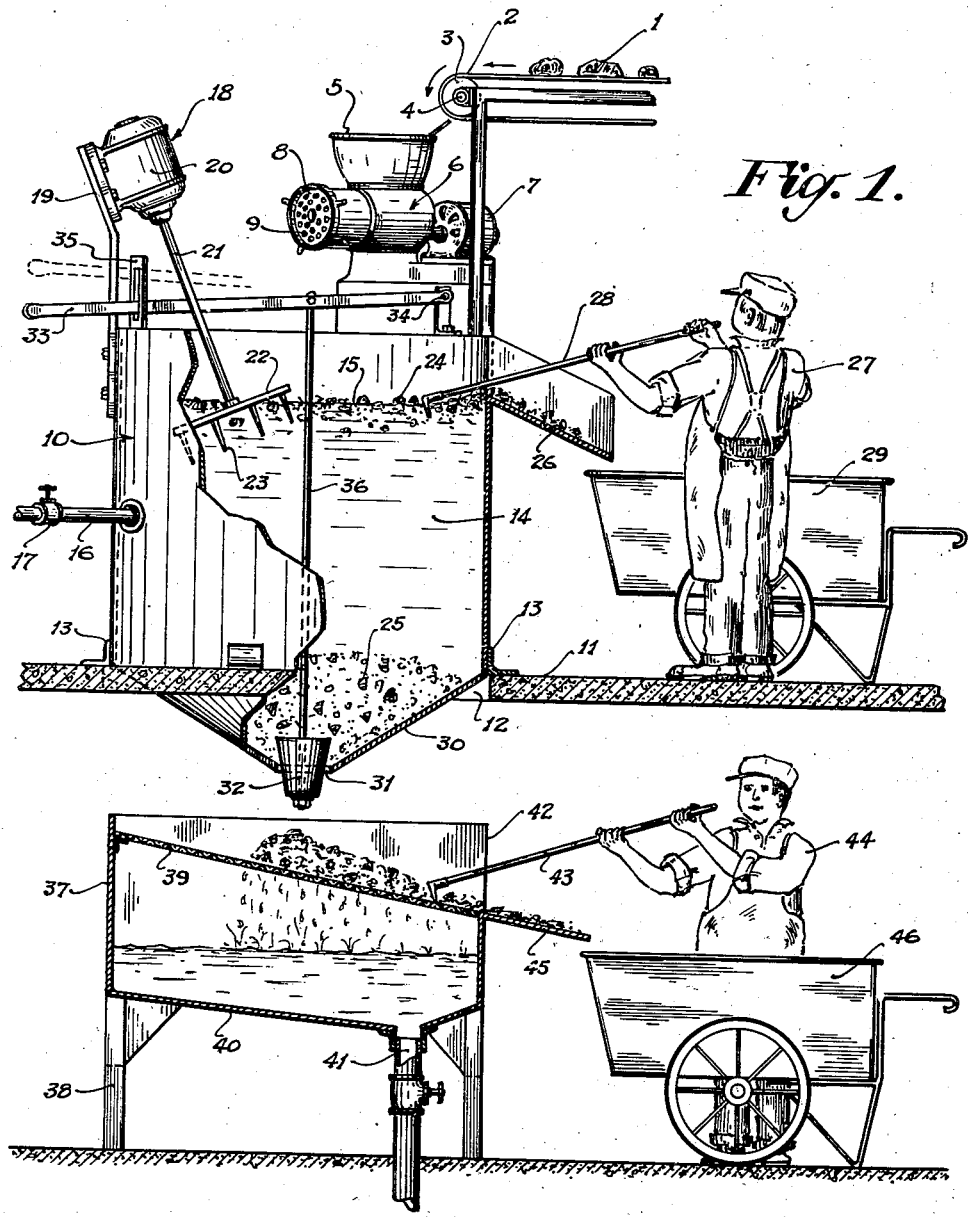

2,281,590

UNITED STATES PATENT OFFICE 2,281,590

MEAT TREATMENT

Lowell R. Newton, Chicago, Ill., assignor to Industrial Patents Corporation, Chicago, Ill., a corporation of Delaware Application April 26, 1940, Serial No. 331,859

4 Claims. (Cl. 146—76)

This invention relates to the treatment of meat.

One of the objects of this invention is to separate the fatty portion of meat from the lean portion thereof.

Another object of this invention is to quickly and economically, and to a large extent automatically, secure lean sausage trimmings from meat which contains a large percentage of fat therein.

The present invention may be described in connection with the recovery of lean meat from pork trimmings, which ordinarily contain a large proportion of fat. Such products as pork sausage preferably contain quantities of fat, but it is very important that the fat content thereof be limited. A large proportion of pork trimmings are excessively fat, and therefore undesirable for use in sausage. Consequently, such trimmings are ordinarily either sent to the lard rendering tank for the removal of the fat as lard, the lean meat being lost as such in the cracklings, or the fat laboriously separated from the lean by hand.

It has been the practice in the packing industry to roughly separate fat from lean in meat which is not excessively fat by hand trimming. It is obvious that this is a slow and expensive process, and one in which no accurate control of the separation can be secured. Heretofore it has been impossible to separate the fat from the lean portions of meat, such as pork, by mechanical means. The present invention discloses a method of mechanically separating fat from lean meat in animal tissue in an inexpensive manner. Not only is the device by which the separation is made relatively inexpensive, but the lean and fatty portions of the animal tissue are more accurately separated than heretofore possible by hand trimming. As a matter of fact, the separation is so thoroughly done that in the case of pork sausage, it is necessary to add fat to the lean meat secured by this process in order to make a satisfactory product.

One of the big advantages of the present invention is that neither the fat nor the lean meat loses its bloom or freshness in the process.

The invention will be readily understood by reference to the drawing, which discloses a schematic diagram, partly in section, of an arrangement of equipment necessary to carry out the teachings of the invention.

In employing the apparatus depicted in the drawing, meat scraps 1 are deposited upon a relatively slow moving belt conveyor 2. The belt conveyor 2 may be driven by any suitable source of power, not shown, and is mounted upon suitable rollers, such as 3, mounted upon shafts, such as 4.

One of the said rollers 3 is so located that the meat 1, which is in the condition in which it has been removed from the carcass, without any intervening defatting or fleshing operations, is delivered by the conveyor 2 to the loading bowl 5 of a meat grinder 6 of conventional type. The grinder 6 is driven by any suitable source of power, such as an electric motor 7. The meat grinder 6 is equipped with a hasher plate 8 provided with a plurality of holes, such as 9, approximately one inch in diameter.

The chopped tissue drops from the grinder 6 into a flotation tank 10 mounted below the grinder 6 and supported by any desirable means, such as floor 11, through which it extends in opening 12, and angles 13. The tank is filled with water 14 to level 15. The temperature of the water 14 in tank 10 should approach the freezing point in order to avoid adversely affecting the lean or fatty portions. Cold water is slowly and continuously added to tank 10 through water supply line 16, which is provided with valve means 17 to adjust the amount of water flowing into tank 10. Upon falling into the tank 10, the chopped tissue is subjected to violent agitation by agitator 18 mounted upon any suitable means 19 in spaced relationship with tank 10. The agitator may comprise a motor 20 propelling a shaft 21 upon which is rigidly affixed plate 22. Agitator arms 23 are rigidly affixed to the plate 22.

Separation of the fat and lean tissue is greatly accelerated by the operation of agitator 18. The particles of fat 24 float to the surface of the water in the more quiet zone on the other side of the tank, and the pieces of lean meat 25 sink to the bottom of the tank 10. The tank 10 is provided at one side with a spillway 26 for the removal of fat without overflowing the tank. The separated fat 24 floats on the surface of the water, and may be removed by an operator 27 by means of rake 28 over the spillway 26, or may be removed by any suitable mechanical means. The fat raked over spillway 26 may be permitted to fall into truck 29, by means of which the fat may be removed to a lard rendering tank.

The bottom of tank 10 is provided with sloping sides 30 and at the apex thereof with a drain 31 which may be closed by any suitable means, such as a plug valve 32. The valve 32 may be operated by any suitable means, such as lever 33, hinged as at 34 to the tank 10 and operating within guide 35. The lever 33 is connected to valve 32 by rod 36. The lean meat 25, which sinks to the bottom of the tank, is periodically drained out of the tank by opening the valve 32 in drain 31.

Preferably the lean meat, removed through drain 31, together with a quantity of cold water which will escape when the valve 32 is opened, will fall into a second tank 37, located below the flotation tank 10. The tank 37 may rest upon suitable supports, such as 38. Preferably the drain tank 37 is provided with a screen 39, and a sloping bottom 40 merging into drain 41. The lean meat is, of course, caught by the screen 39 while the water drains therefrom, and is removed by drain 41. The water removed through drain 41 will ordinarily contain a small quantity of fat, and can be taken to the lard tanks for the recovery of that small percentage of lard, or may be permitted to drain into a sewer or other means for removing waste water.

Preferably one side of drain tank, such as at 42, will cut away down to the level of the screen 39, so that the lean meat may be moved from the screen 39 by any suitable means, such as rake 43, manually manipulated by an operator 44. For this purpose I may provide the opening 42 with a lip 45, so that the lean meat removed from screen 39 can fall into suitable collecting means, such as a truck 46.

I have found in practice that the grinder plate with one inch holes gives the optimum condition with respect to the appearance of the lean trimmings, which are a standard item of packing house trade. I have found that the use of a plate with holes of this size quite effectively separate the fat from the lean. Although a more thorough separation could be secured by the use of relatively small holes, such is impractical for this purpose. The use of relatively small holes in the hasher plate would result in a lean product with the appearance of hamburger, which would be very undesirable from the commercial point of view. Lean trimmings passing through the one inch holes will be sufficiently large to be readily saleable to the sausage industry. The use of a grinder plate with holes substantially larger than one inch tends to be less effective in the separation of fat from lean meat in many instances.

It is very necessary that the water in which the process is carried on be quite cold, preferably as near freezing as possible, in order to preserve the appearance of the lean trimmings. Warm water would adversely affect the appearance of the lean meat particles, such as by bleaching the product. Also, the use of cold temperatures tends to prevent bacterial contamination. This is important as the lean trimmings can not be further treated, such as by drying or curing, until they reach the sausage factory. In many instances such trimmings may be stored for an extended period before use.

The process of the present invention has many advantages over conventional practice. In the first place, there is a very definite reduction in the cost of separating fat from the lean trimmings when the method of the present invention is employed. In the second place, the lean trimmings have a more uniform, and in some instances a lower, fat content than trimmings separated by the conventional hand method. In the third place, the fat and the lean meat tend to separate in the grinder due to the pressure and grinding action exerted therein, so that the fat going to the lard rendering tanks contains less lean meat than that prepared by conventional hand means. This is a distinct advantage as any lean meat contained in the fat going to the rendering tank is recovered only in the form of cracklings, and is of value only in the preparation of meat meal, such as those used in animal feeds.

It will be seen that the present invention involves the separation of fat from lean by a method which involves purely mechanical steps, which can be made automatic to a great extent, and which eliminates expensive hand labor. It will be understood, of course, that the present invention may be carried out in any of several ways without departing from the spirit of this invention. For example, the tank 10 could be equipped with an automatic rake, or with paddles mounted upon a slow moving conveyor moving the paddles toward the spillway 26. Likewise the lean meat trimmings caught upon the screen 39 could be removed therefrom by a mechanical rake or by like paddles mounted upon a slow moving conveyor, or by substituting a screen type endless belt conveyor for the screen 39, which would move the trimmings to the discharge side of the tank, while permitting the water to drain therefrom.

It is, therefore, to be understood that this invention is not to be limited to the apparatus above described. Accordingly, the appended claims are to be given an interpretation commensurate with the novelty herein described and as broad as may be permitted by the prior art.

I claim:

1. The method of treating meat containing substantial amounts of fatty and lean constituents to separate the fat from the lean portion which comprises hashing the meat to form lean particles and fat particles loosened from the lean particles, contacting the hashed product with a large proportion of water at a temperature below the melting point of the fat and approaching the freezing point of water to separate the fatty from the lean particles and recovering said separated particles by gravity.

2. The method of treating meat containing substantial amounts of fatty and lean constituents to separate the fat from the lean portion, which comprises grinding the meat into small particles whereby the fat is loosened from the lean component, agitating the ground meat with a large volume of cold water at a temperature substantially below the melting point of the fatty constituents and approaching the freezing point of water to separate the fat particles from the lean particles and to segregate said particles by gravity, and recovering said separated particles from the water.

3. The method of treating scraps of meat to separate the fat from the lean portion, which comprises grinding the meat into coarse particles whereby the fat is loosened from the lean meat, agitating the ground heat with an excess of cold water at a temperature approaching the freezing point of the water whereby the fatty and lean components are separated into discrete particles and recovering said separated particles by gravity.

4. The method of treating meat scraps comprising pork trimmings to separate the fat from the lean portion, which comprises hashing the meat into particles of about one inch in diameter whereby the fat is loosened from the lean meat, agitating the hashed product with a body of cold water at a temperature substantially below the melting point of the fat and approaching the freezing point of water to separate the fatty and lean particles by gravity and removing the fatty particles from the upper portion of the body of water and the lean particles from the lower portion of said body of water.

LOWELL R. NEWTON.